Oct. 28, 1924.
K. O. MUEHLBERG
1,512,999
APPARATUS FOR REAMING BEARINGS IN CONNECTING RODS, PISTONS, AND THE LIKE
Filed Feb. 4, 1922   3 Sheets-Sheet 1
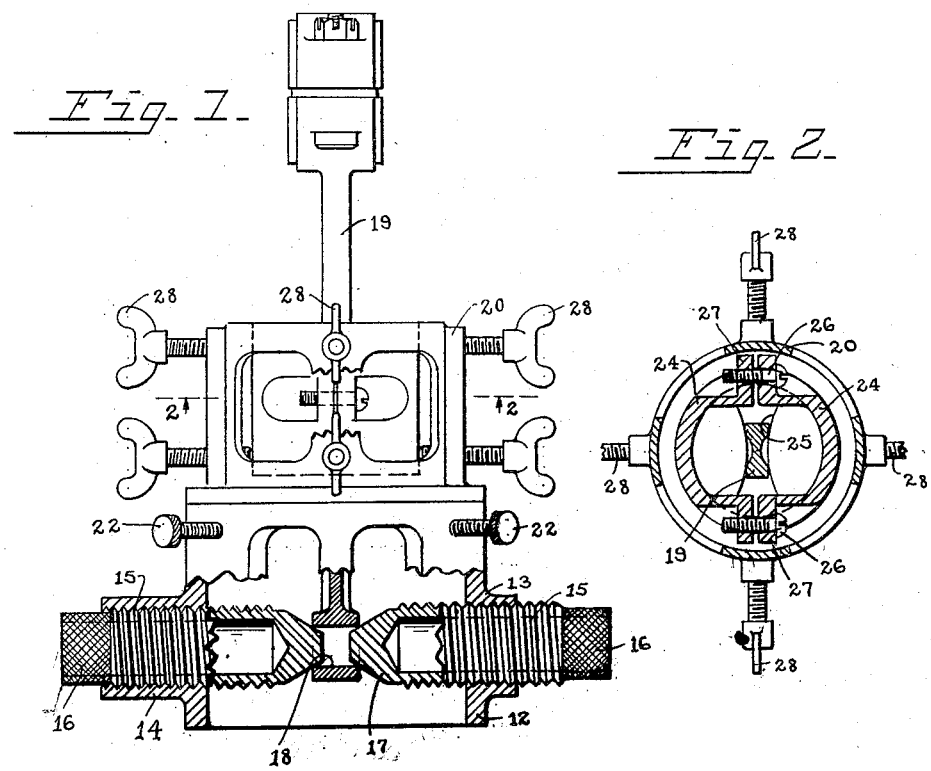
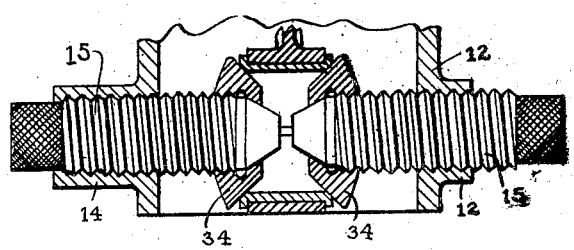
INVENTOR.
Karl O. Muehlberg.
BY Morsell & Keeney.
ATTORNEYS.

Oct. 28, 1924.                                               1,512,999
K. O. MUEHLBERG
APPARATUS FOR REAMING BEARINGS IN CONNECTING RODS, PISTONS, AND THE LIKE
Filed Feb. 4, 1922          3 Sheets-Sheet 2
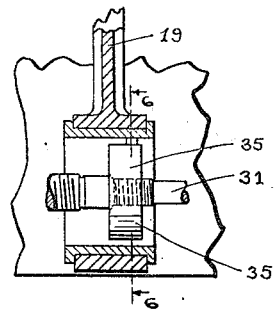
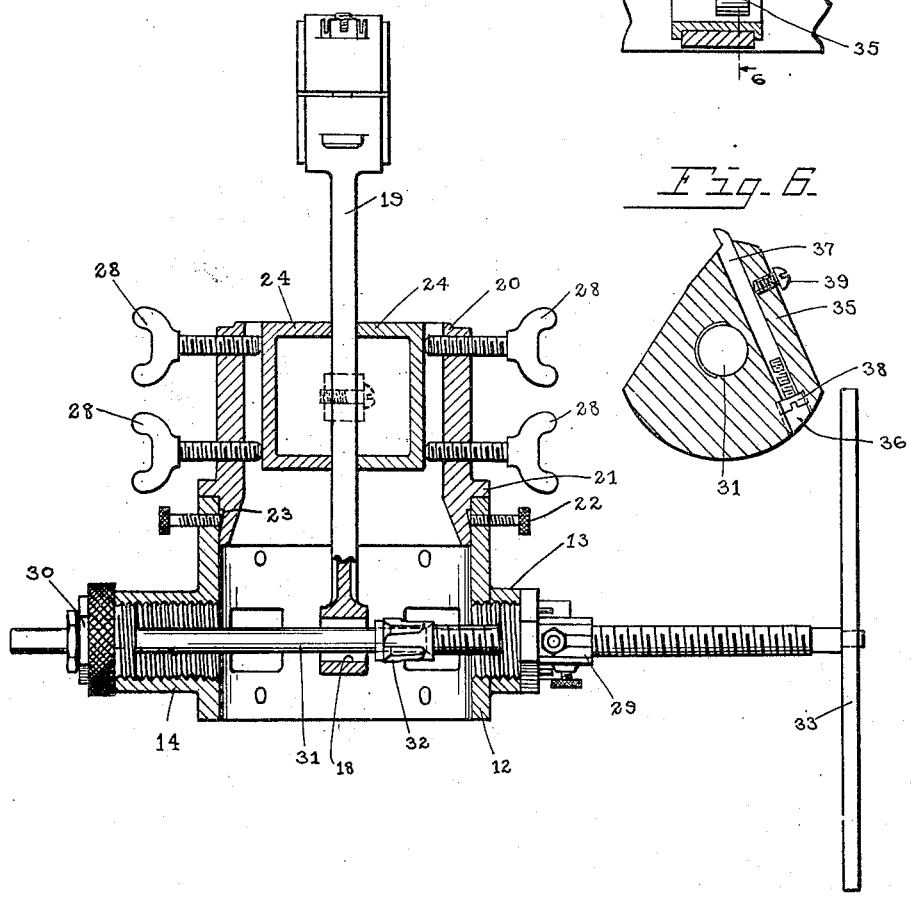
INVENTOR.
Karl O. Muehlberg.
BY
Morsell & Keeney,
ATTORNEYS.

Oct. 28, 1924.

K. O. MUEHLBERG 1,512,999

APPARATUS FOR REAMING BEARINGS IN CONNECTING RODS, PISTONS, AND THE LIKE

Filed Feb. 4, 1922

INVENTOR.
Karl O. Muehlberg.
BY
Morsell & Keeney,
ATTORNEYS.

Patented Oct. 28, 1924.

1,512,999

UNITED STATES PATENT OFFICE.

KARL O. MUEHLBERG, OF MANITOWOC, WISCONSIN.

APPARATUS FOR REAMING BEARINGS IN CONNECTING RODS, PISTONS, AND THE LIKE.

Application filed February 4, 1922. Serial No. 534,116.

*To all whom it may concern:*

Be it known that I, KARL O. MUEHLBERG, a citizen of the United States, and resident of Manitowoc, in the county of Manitowoc and State of Wisconsin, have invented new and useful Improvements in Apparatus for Reaming Bearings in Connecting Rods, Pistons, and the like, of which the following is a description, reference being had to the accompanying drawings, which are a part of this specification.

This invention relates to improvements in apparatus for reaming bearings in connecting rods, pistons and the like.

One of the objects of the invention is the provision of means of simple construction whereby either the bearings in engine connecting rods or the wrist pin bearings in pistons for internal combustion engines may be quickly, conveniently and accurately reamed or resurfaced.

A further object of the invention is the provision of a pair of clamping members of novel construction and so arranged that they may be readily clamped against the opposing sides of a connecting rod and then inserted with the connecting rod into a holding member and temporarily secured therein with the bearing to be reamed in axial alignment with bearings provided in said holding member which support the resurfacing tool, the clamping members about the connecting rod being then firmly secured against movement relative to the holding member so that the connecting rod will be rigidly supported while the bearing thereof is being resurfaced.

The invention contemplates the provision of a hollow holding member in which the piston may be placed, the holding member having a pair of oppositely disposed screw threaded members provided with tapered bearing surfaces on their inner ends; and a further object of the invention is the provision of an expansible tubular member which may be inserted when in a contracted state into the wrist pin bearings of the piston and then engaged by the tapered bearings surfaces of the screw-threaded members to expand the same thereby bringing the tubular member into tight engagement with the wrist pin bearings of the piston and the latter into exact alignment with the axis of said threaded members, in which position the piston may be secured for the reaming operation.

The invention consists in the novel constructions, arrangements and devices to be hereinafter described and claimed for carrying out the above stated objects and such other objects as will appear from the following description of certain preferred embodiments illustrated in the accompanying drawings, wherein—

Fig. 1 is a side elevational view, partially in section, of apparatus embodying certain features of the invention with a connecting rod positioned therein;

Fig. 2 is a transverse sectional view taken on the line 2—2 of Fig. 1;

Fig. 3 is a vertical sectional view of the apparatus shown in Fig. 1, the reaming tool being in operative position;

Fig. 4 is a detail view showing an arrangement whereby connecting rods having relatively large bearings may be aligned with respect to the bearings for the shaft carrying the reaming tool;

Fig. 5 is a detail view showing a reamer particularly adapted to resurface bearings of relatively large diameters;

Fig. 6 is a sectional view, on an enlarged scale, taken on the line 6—6 of Fig. 5;

Like characters of reference designate like parts in the several views.

Figure 7:
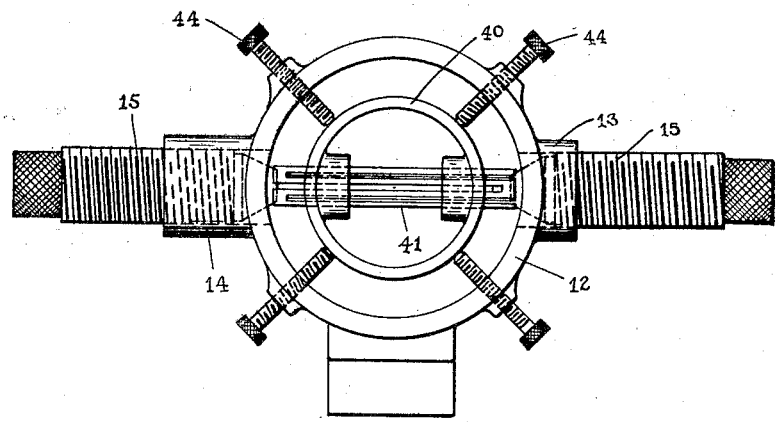
Fig. 7 is a plan view of the apparatus shown in Fig. 1 as adapted to hold a piston while its wrist pin bearings are resurfaced.

Referring first to Figs. 1 to 6, inclusive, of the drawings it will be seen that the apparatus is shown as adapted to hold connecting rods while the bearings thereof are reamed. The apparatus includes a hollow holding member 12 which is substantially cylindrical and approximately of the height of an ordinary piston of an internal combustion engine. The holding member is provided with oppositely transversely extending apertured bosses 13 and 14 which are preferably internally threaded for the reception of threaded plugs 15 the outer ends of which may be provided with finger gripping portions 16 and the inner ends of which are provided with tapered bearing surfaces 17 so that the plugs may be readily inserted from opposite sides into the transversely disposed bearing 18 of the connecting rod 19. The lower end of a superposed cylindrical holding member 20 is adapted to slip into the upper end of the holding member 12, downward movement of the member 20 being limited by an annular flange 21 adapted to bear against the upper end of the member 12. The member 12 carries a plurality of radially extending set screws 22, the inner ends thereof being adapted to bear against the tapered surface 23 of the member 20, thereby firmly securing the member 20 to the member 12.

Before the connecting rod is inserted into the members 12 and 20, as shown in Figs. 1 and 3, of the drawings, a pair of holding members 24 having concaved surfaces 25 adapted to bear against the respective sides of the connecting rod are clamped thereagainst by screws 26 which extend through the cooperating perforated lugs 27 of the respective members 24. The members 24 are clamped on the connecting rod substantially in the position shown in Fig. 3 with relation to the holding member 20 and after the threaded plugs 15 have been moved into the position shown in Fig. 1 so that the bearing 18 of the connecting rod is in alignment with the axis of the bosses 13 and 14, the radially extending thumb screws 28 carried by the holding member 20 are turned into firm bearing engagement with the outer sides of the holding members 24, thus effectively securing the connecting rod in the desired position.

After the connecting rod has been secured in the holding member 20, the threaded plugs 15 are withdrawn and bearing members 29 and 30 are inserted into the respective bosses 13 and 14 of the holding member 12. A transversely extending shaft 31 is positioned in the bearings 29 and 30, and carries a reaming tool 32 of any desired construction, that portion of the shaft which extends through the bearing 29 being screw-threaded so that as the shaft is turned by the handle 33, the reaming tool 32 will feed through the bearing 18 and resurface the same. The bearings 29 and 30 may be of any desired construction but are preferably of the type shown and described in my co-pending application Serial No. 467,428, filed May 6th, 1921.

If desired, pairs of interchangeable collars 34 of various sizes may be provided which are adapted to be threaded onto the adjacent inner ends of the threaded plugs 15, as shown in Fig. 4, to adapt the aligning apparatus to bearings of various diameters.

When it is desired to ream relatively large bearings, a reaming tool 35 of the construction shown in Figs. 5 and 6 may be employed on the shaft 31, said tool comprising a block adapted to be threaded onto the shaft 31, and having a slot 36 in which a cutting tool 37 is mounted. The tool 37 is moved into the desired position by a screw 38 and it may then be locked in that position by a screw 39.

Figure 8:
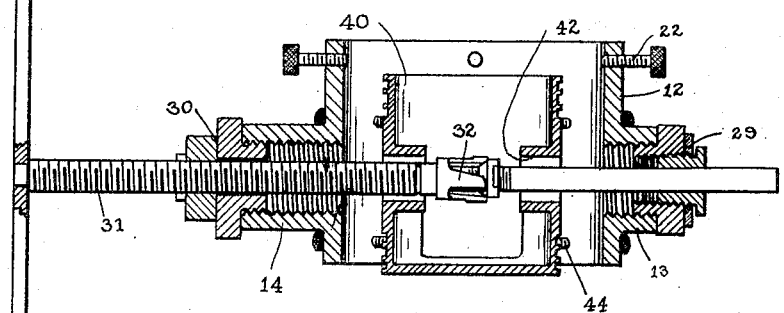
Fig. 8 is a vertical sectional view of the parts shown in Fig. 7, the reaming tool being in operative position in the wrist pin bearings of the piston.
Figure 9:
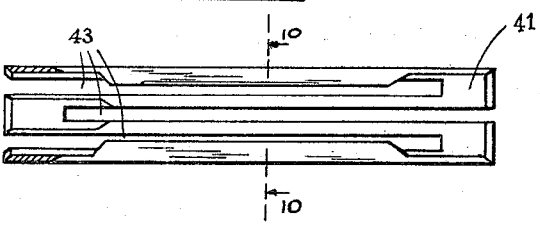
Fig. 9 is a longitudinal sectional view of the expansible tube for initially positioning the piston with its wrist pin bearings in alignment with the bearings of the holding member which support the reaming tool.
Figure 10:
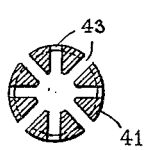
Fig. 10 is a sectional view taken on the line 10—10 of Fig. 9.

When the apparatus is to be used for holding pistons while the wrist pin bearings are reamed, the holding member 20 is removed by loosening the screws 22 and the piston 40 is placed within the holding member 12 substantially as shown in Figs. 7 and 8. An extensible tubular member 41 is slipped through the wrist pin bearings 42 of the piston into the position shown in Fig. 7. The member 41 is shown in detail in Figs. 9 and 10, this member being provided with a plurality of longitudinally extending slits 43 which are staggered with relation to each other from the opposite ends thereof. The threaded plugs 15 are then inserted into the respective bosses 13 and 14 of the holding member 12 so as to bring their respective adjacent ends into bearing engagement with the opposing ends of the tubular member 41, thereby expanding the member 41 into firm engagement with the wrist pin bearings of the piston so that said bearings are brought into exact alignment with the axis of the bosses 13 and 14. The holding member 12 carries a plurality of radially extending set screws 44 which are turned to bring the inner ends thereof into binding engagement with the outer sides of the piston, as clearly shown in Fig. 7. When the piston is thus secured in place, the threaded plugs 15 and the extensible member 41 are removed and the bearings 29 and 30 are then inserted in the respective bosses 13 and 14. The feed shaft 31 with its reaming tool 33 may then be inserted in the bearings 29 and 30 and the wrist pin bearings of the pin resurfaced in the same manner that the bearings of the connecting rod are resurfaced. It will be noted that the boss 14 is considerably longer than the boss 13 of the holding member 12. The extra space in the boss 14 is for the accommodation of the reaming tool 32 prior to being fed through the adjacent wrist pin bearing of the piston.

It will be obvious from the foregoing description that the apparatus is equally well adapted for holding either connecting rods or pistons while the bearings thereof are reamed or resurfaced.

I claim:

1. Apparatus of the class described comprising a hollow holding member having a transversely disposed aperture, adapted to receive and hold an engine piston with its bearings in axial alinement with said aperture, a holding member superposed on said first mentioned member, means to secure said members together, means to secure a connecting rod or the like in said second holding member with the bearing thereof in alignment with said aperture, and a resurfacing tool adapted to be inserted through said aperture and into and through said bearings, for the purpose specified.

2. Apparatus of the class described comprising a hollow holding member adapted to receive an article the bearing of which is to be reamed, said member having oppositely transversely disposed apertures, a pair of members adapted to be clamped about the article, means adapted to be positioned in said apertures and to engage the bearing of said article to bring said bearing into axial alignment with said apertures, adjustable means carried by said holding member and adapted to engage said clamping members to hold the article against movement relative to said member as and after said means have been withdrawn, and a resurfacing tool adapted to be inserted through one of said apertures and into and through the bearing in said article, for the purpose specified.

3. In apparatus of the class described, the combination of a member adapted to receive and hold an article the bearing of which is to be surfaced, said member having oppositely transversely disposed apertures, centering members adapted to be inserted into said apertures, interchangeable positioning members mounted on said respective centering members and adapted to engage the bearing of said article, and means for rigidly securing said article in said holding member, whereby said centering and positioning members may be withdrawn, for the purpose specified.

4. In apparatus of the class described, the combination of a member adapted to receive and hold an article, the bearing of which is to be surfaced, said member having oppositely transversely disposed apertures, a pair of readily removable centering members adapted to be inserted into said apertures, interchangeable positioning members mounted on said respective centering members, said positioning members having opposed tapered ends adapted to engage the bearing of said article from opposite sides, and means carried by said holding member for securing said article therein in the position determined by said positioning members, whereby they may be removed, for the purpose specified.

5. In apparatus of the class described, the combination of a member adapted to receive and hold an article the bearing of which is to be surfaced, said member having oppositely transversely disposed internally threaded apertures, studs threaded into said respective apertures and collars threaded on the adjacent ends of said respective studs, provided with opposed tapered ends adapted to engage the bearing of said article from opposite sides, said studs and collars being readily removable to permit the introduction of a resurfacing tool through said apertures.

6. An apparatus of the class described comprising a hollow holding member provided with oppositely disposed transverse apertures, adapted to receive and hold an engine piston; an independent detachable member adapted to be secured to said hollow member, and to receive and hold a connecting rod; readily removable means adapted to be inserted through said apertures to engage and align the bearings of a piston or a rod with said apertures; means carried by said hollow holding member adapted to secure a piston in such position; and independent means adapted to secure a connecting rod to said detachable member in said aligned position.

7. In an apparatus of the class described the combination of a hollow holding member provided with oppositely disposed transverse apertures, adapted to receive and hold an engine piston; a pair of clamping members adapted to engage and support a connecting rod; readily removable means adapted to be inserted in said apertures to engage and axially align the bearings of a piston or a connecting rod with said apertures; means for securing a piston within said hollow member in such aligned position; means for securing said clamping members and a connecting rod to said hollow holding member; and a cutting tool adapted to be inserted through said apertures to act upon said bearings.

In testimony whereof, I affix my signature.

KARL O. MUEHLBERG.